US009382910B2

United States Patent
Jan et al.

(10) Patent No.: US 9,382,910 B2
(45) Date of Patent: Jul. 5, 2016

(54) AUXILIARY POWER UNITS (APUS) AND METHODS AND SYSTEMS FOR ACTIVATION AND DEACTIVATION OF A LOAD COMPRESSOR THEREIN

(71) Applicant: HONEYWELL INTERNATIONAL INC., Morristown, NJ (US)

(72) Inventors: David K. Jan, Fountain Hills, AZ (US); Christopher Zollars, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 558 days.

(21) Appl. No.: 13/781,239

(22) Filed: Feb. 28, 2013

(65) Prior Publication Data

US 2014/0241906 A1    Aug. 28, 2014

(51) Int. Cl.
| | |
|---|---|
| F02C 6/08 | (2006.01) |
| F02C 9/18 | (2006.01) |
| F04D 17/10 | (2006.01) |
| F01D 15/08 | (2006.01) |
| F04D 25/02 | (2006.01) |
| F04D 27/02 | (2006.01) |

(52) U.S. Cl.
CPC ............... *F04D 17/10* (2013.01); *F01D 15/08* (2013.01); *F02C 6/08* (2013.01); *F02C 9/18* (2013.01); *F04D 25/022* (2013.01); *F04D 27/0292* (2013.01); *F05D 2220/50* (2013.01)

(58) Field of Classification Search
CPC .......... F05D 2220/50; F02C 6/08; F02C 7/32; F02C 9/16; F02C 9/18
USPC .......................................................... 60/785
See application file for complete search history.

(56) References Cited

U.S. PATENT DOCUMENTS

| | | | |
|---|---|---|---|
| 4,091,613 A | 5/1978 | Young | |
| 4,434,624 A | 3/1984 | Cronin et al. | |

(Continued)

FOREIGN PATENT DOCUMENTS

| | | |
|---|---|---|
| EP | 2347956 A2 | 7/2011 |
| GB | 2076897 A | 12/1981 |

OTHER PUBLICATIONS

EP Search Report for Application No. 14154763.8, Dated Jun. 24, 2014.

*Primary Examiner* — Peter J Bertheaud
(74) *Attorney, Agent, or Firm* — Ingrassia Fisher & Lorenz, P.C.

(57) ABSTRACT

Auxiliary power units and methods and systems for activation and deactivation of a load compressor therein are provided. Auxiliary power unit includes the load compressor having an impeller, APU engine, coupling member, pre-spinning means, and APU controller. APU engine is adapted to be mechanically engaged to load compressor to drive load compressor to provide pneumatic power and to be disengaged when the need for pneumatic power ceases. Coupling member couples load compressor and APU engine and is configured to be controllably moved between an engaged position in which the APU engine is mechanically engaged with the load compressor, and a disengaged position, in which the APU engine is disengaged from the load compressor. APU controller is operably coupled to load compressor, APU engine, coupling member, and pre-spinning means and adapted to receive and be responsive to rotational speed signals for controlling movement of coupling member between engaged and disengaged positions.

19 Claims, 7 Drawing Sheets

(56) References Cited

U.S. PATENT DOCUMENTS

| | | | |
|---|---|---|---|
| 4,542,722 A | 9/1985 | Reynolds | |
| 4,834,622 A * | 5/1989 | Schuh | F02C 3/085 |
| | | | 415/27 |
| 5,174,109 A | 12/1992 | Lampe | |
| 6,142,418 A | 11/2000 | Weber et al. | |
| 6,278,262 B1 | 8/2001 | Ullyott | |
| 6,463,740 B1 * | 10/2002 | Schmidt | F02C 9/56 |
| | | | 192/3.29 |
| 7,805,947 B2 | 10/2010 | Moulebhar | |
| 7,874,161 B2 * | 1/2011 | Williams | F01D 17/04 |
| | | | 60/39.093 |
| 8,118,253 B1 | 2/2012 | Casado Abarquero et al. | |
| 8,146,370 B2 | 4/2012 | Zeiner et al. | |
| 8,813,472 B2 * | 8/2014 | West | F01K 23/10 |
| | | | 60/238 |
| 2010/0252675 A1 | 10/2010 | Malkin et al. | |
| 2012/0111022 A1 | 5/2012 | Dyer | |
| 2012/0117974 A1 * | 5/2012 | Hilgeman | F02C 6/06 |
| | | | 60/772 |
| 2012/0119020 A1 | 5/2012 | Burns et al. | |
| 2012/0119021 A1 | 5/2012 | Burns et al. | |
| 2012/0153076 A1 | 6/2012 | Burns et al. | |
| 2012/0216549 A1 | 8/2012 | Burns | |

* cited by examiner

AUXILIARY POWER UNITS (APUS) AND METHODS AND SYSTEMS FOR ACTIVATION AND DEACTIVATION OF A LOAD COMPRESSOR THEREIN

TECHNICAL FIELD

The present invention generally relates to auxiliary power units ("APU"s), and more particularly relates to methods and systems for activation and deactivation of a load compressor therein.

BACKGROUND

An operating aircraft auxiliary power unit (APU) provides energy for functions other than propulsion. An APU generally consists of a gas turbine engine (hereinafter referred to as an "APU engine), a generator, and a load compressor (LC). Before the main propulsion engines are started, the APU engine is started, generally by a battery or hydraulic accumulator and fuel. The operating APU provides auxiliary electrical power and pneumatic power to the aircraft while the main propulsion engines are shut down, such as during aircraft ground operations and provides backup electrical and pneumatic power for in-flight operations. The operating APU supplies the electrical power via the generator which is driven by the operating APU engine. The activated load compressor in the operating APU supplies the pneumatic power for various aircraft systems and functions. These systems and functions may vary, and may include the aircraft environmental control system (ECS), the cabin pressure control system, and/or main propulsion engine start (MES) air.

APU efficiency is generally reported in terms of specific fuel consumption (SFC), the mass of fuel consumed per unit of energy output. Continued operation of the load compressor when pneumatic power is not needed (but the APU is still operating, albeit in "generator-only mode" to provide electrical power) results in a parasitic loss of fuel as well as undesirable air emissions. Therefore, it is beneficial to be able to deactivate the load compressor in the operating APU when pneumatic power is not needed, but to be able to (re)activate the load compressor in the operating APU when pneumatic power (auxiliary air) is needed. In a typical aircraft, for example, an APU Master Switch is turned to the "Start" position to initiate the APU start and is released to the "Run" position, which is the normal operating mode for an "operating APU". When the APU Master Switch is turned to the "Off" position, the auxiliary air is automatically shut off and the APU shuts down. When the APU Master Switch is in the "Run" position and an APU Air switch is turned "ON", the load compressor may be activated to provide compressed air (hereinafter "load compressor" or "LC" air) to the various aircraft systems and functions. When the APU Air switch is turned "Off", the APU air shutoff valve closes to isolate the APU from the aircraft pneumatic system, and the load compressor is deactivated to standby mode. The APU Master switch turned to the "Off" position will shut down the APU regardless of the APU AIR switch position.

In a conventional operating APU, the activated load compressor is engaged with the operating APU engine and the deactivated load compressor is disengaged from the operating APU engine. The load compressor may be engaged with and disengaged from the operating APU engine via one or more friction clutches. Unfortunately, friction clutches that have been used to engage the load compressor with the operating APU engine and disengage the load compressor therefrom tend to be heavy and have less than ideal reliability in APUs due to high rotational speeds. High rotational speeds impose high inertial loading, leading to excessive temperatures and accelerated wear and failure of the friction clutch components, leading to clutch failures. In addition, oil-cooled friction clutches impose oil cooling system penalties. Dynamic disconnect clutches can also be used for disengaging the load compressor in the operating APU, but can only disengage at speed and cannot re-engage until the APU is shut down, thereby limiting operational flexibility.

Accordingly, it is desirable to provide auxiliary power units and methods and systems for activation and deactivation of a load compressor therein. In addition, it is also desirable to provide auxiliary power units in which the load compressor therein may be selectively engaged with and disengaged to the operating APU engine without a friction clutch, thereby resulting in a more lightweight and less complex APU, lower inertial loading and greater APU reliability. It is also desirable to provide methods and systems to selectively disengage the load compressor from the operating APU engine when pneumatic power is not needed, thereby improving aircraft fuel economy and reducing undesirable air emissions and to selectively engage with the operating APU engine when pneumatic power is needed, thereby maintaining operational flexibility. Furthermore, other desirable features and characteristics of the present invention will become apparent from the subsequent detailed description of the invention and the appended claims, taken in conjunction with the accompanying drawings and this background of the invention.

BRIEF SUMMARY

Auxiliary power units are provided. In accordance with one exemplary embodiment, the auxiliary power unit includes a load compressor having an impeller, an APU engine, a coupling member, pre-spinning means, and an APU controller. APU engine is adapted to be mechanically engaged to load compressor to drive load compressor to provide pneumatic power and to be disengaged when the need for pneumatic power ceases. Coupling member couples load compressor and APU engine and is configured to be controllably moved between an engaged position in which the APU engine is mechanically engaged with the load compressor, and a disengaged position, in which the APU engine is disengaged from the load compressor. APU controller is operably coupled to load compressor, APU engine, coupling member, and pre-spinning means and adapted to receive and be responsive to rotational speed signals for controlling movement of coupling member between engaged and disengaged positions.

Methods are provided for activation and deactivation of a load compressor in an operating auxiliary power unit (APU) in accordance with yet another exemplary embodiment of the present invention. The method comprises selectively engaging a load compressor with an APU engine and selectively disengaging the load compressor from the operating APU engine to deactivate the load compressor. The step of selectively engaging a load compressor comprises pre-spinning an impeller of the load compressor to a rotational speed setpoint with compressor discharge bleed air; and mechanically engaging the load compressor with the operating APU engine when a rotational speed of the impeller reaches the rotational speed setpoint.

Systems are provided for activation and deactivation of a load compressor in an operating auxiliary power unit (APU) in accordance with yet another exemplary embodiment of the present invention. The system comprises a load compressor in fluid flow communication with a source of compressor discharge bleed air and adapted to be mechanically engaged with an operating APU engine when the demand for load compressor (LC) air exists and disengaged therefrom when demand therefor ceases. The system further comprises a coupling member coupled between the load compressor and the APU engine and configured to be controllably moved between an engaged position, in which the load compressor is mechanically engaged with the APU engine, and a disengaged position, in which the APU engine is disengaged from the load compressor. A bleed control circuit supplies compressor discharge bleed air to an impeller of the load compressor to pre-spin the impeller to a rotational speed setpoint. An APU controller is operably coupled to the load compressor, the bleed control circuit, a coupling member actuator, and the APU engine and adapted to receive a first speed signal representative of a rotational speed of the impeller of the load compressor and a second speed signal representative of a rotational speed of the APU engine and configured, in response thereto, to selectively (i) cause the compressor discharge bleed air to pre-spin the impeller; and (ii) move the coupling member between the engaged and disengaged positions, the coupling member actuator moving the coupling member to the engaged position when the impeller rotational speed matches the rotational speed setpoint.

Furthermore, other desirable features and characteristics of the auxiliary power units and the methods and systems will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to auxiliary power units (APUs) and systems and methods for activation and deactivation of a load compressor therein. The load compressor is adapted to be selectively engaged with an APU engine in the operating APU when the load compressor is activated because of a demand for pneumatic power and selectively disengaged therefrom when the load compressor is deactivated because the demand for pneumatic power ceases. Engagement of the load compressor with the operating APU engine results in the operating APU engine driving the load compressor to supply pneumatic power for various aircraft systems and functions. As noted above, these systems and functions may vary, and may include the aircraft environmental control system (ECS), the cabin pressure control system, and/or main propulsion engine start (MES) air. Selective disengagement of the load compressor from the operating APU engine when demand for pneumatic power ceases improves aircraft fuel economy, reduces undesirable air emissions, and improves APU performance. The deactivated load compressor is in "standby mode", enabling the load compressor to be reactivated quickly when the need for pneumatic power exists. When the load compressor is disengaged from the operating APU engine, the operating APU provides electrical power only (i.e., the APU is in generator-only mode). While the various embodiments are described for an aircraft APU, it is to be understood that principles of the inventive subject matter may be applied to APUs other than aircraft APUs.

Referring now specifically to FIGS. 1 through 5B, according to exemplary embodiments, a simplified schematic diagram of an exemplary auxiliary power unit (APU) 10 in a system for activating and deactivating a load compressor (LC) 14 therein is illustrated. The illustrated APU 10 comprises an APU engine 12, the load compressor (LC) 14, a gearbox 16, and a combination starter/generator 26. The APU engine 12 comprises a gas generator compressor 18, a combustor 20, and a gas generator turbine 22. The combustor 20 is positioned downstream from the gas generator compressor 18 and the gas generator turbine 22 is coupled coaxially with compressor downstream from combustor. The gas generator turbine 22 is in flow communication with the combustor 20. The APU engine 12 is the gas generator portion of the engine and produces all the shaft power for the APU 10. During operation of the APU engine 12, as is known in the art, the gas generator compressor 18 draws ambient air into an inlet thereof (not shown), compresses the air, and supplies a majority of the compressed air to the combustor 20. It will be appreciated that the gas generator compressor 18 may be implemented using any one of numerous types of compressors now known or developed in the future. For example, the gas generator compressor 18 may be a single-stage or multi-stage centrifugal compressor. The combustor 20 receives the compressed air from the gas generator compressor 18, and also receives a flow of fuel from a non-illustrated fuel source via a fuel metering valve (not shown). The fuel and compressed air are mixed within the combustor 20, and are ignited to produce relatively high-energy combustion gas. The combustor 20 may be implemented as any one of numerous types of combustors now known or developed in the future. Non-limiting examples of presently known combustors include various can-type combustors, various reverse-flow combustors, various through-flow combustors, and various slinger combustors. No matter the particular combustor configuration used, the relatively high-energy combustion gas that is generated in the combustor is supplied to the gas generator turbine 22. As the high-energy combustion gas expands through the gas generator turbine 22, it impinges on the turbine blades (not shown), causing the gas generator turbine 22 to rotate. It will be appreciated that the gas generator turbine 22 may be implemented using any one of numerous types of turbines now known or developed in the future including, for example, a vaned radial turbine, a vaneless radial turbine, and a vaned axial turbine. No matter the particular type of gas generator turbine that is used, the gas generator turbine includes a rotatable output shaft 24 that drives the gas generator compressor 18 and the load compressor 14. More specifically, the load compressor may be directly driven by the rotatable output shaft 24 of the APU engine or indirectly driven as illustrated, by the gearbox output shaft 25 (FIGS. 1, 2A and 2B, and 5A and B)) (sometimes referred to as a "gearbox-driven load compressor") as hereinafter described, both arrangements referred to generally herein as the operating APU engine driving the load compressor.

In the exemplary APU illustrated schematically in FIGS. 1, 2A through 2B, and 5A through 5B, the gearbox 16 couples the APU engine 12 to the combination starter/generator 26, that is used for APU starting and electrical power generation to reduce APU complexity. In other non-illustrated APU configurations, the gearbox 16 may couple the APU engine to a generator, transferring power from the output shaft 24 of the APU engine to the generator that provides electrical power to the aircraft. Within the gearbox 16, power may also be transferred to engine accessories (not shown) such as the fuel control unit, the lubrication module, and cooling fan. In addition, the APU may further include a starter motor (not shown) connected through the gear train to perform the APU starting function.

Figure 1:
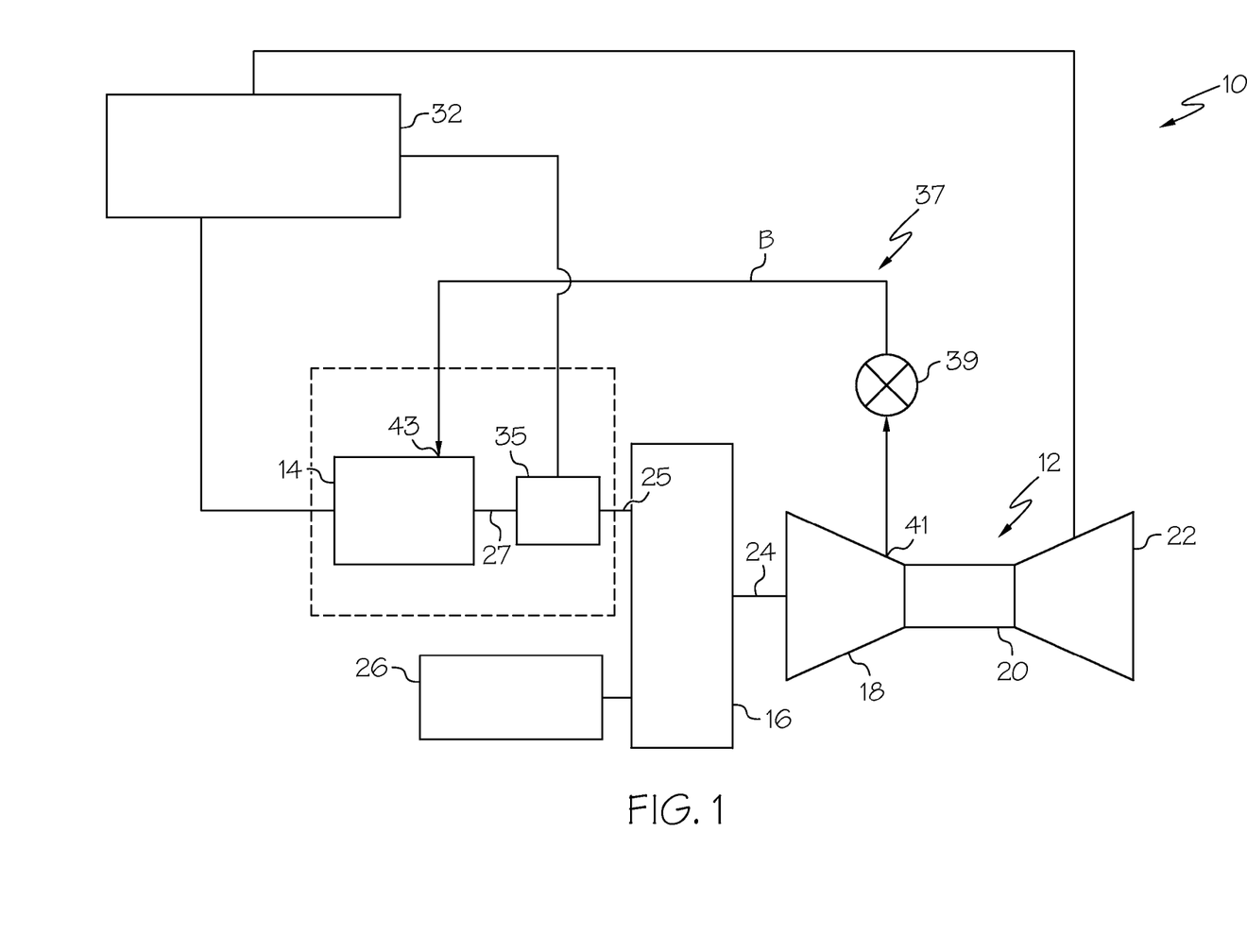
FIG. 1 is a simplified schematic diagram of an exemplary APU in a system for performing the method of FIG. 4, the encircled region illustrating a load compressor coupled to a gearbox via a coupler, according to exemplary embodiments.

The gearbox 16 also couples the APU engine 12 to the load compressor 14 to drive the load compressor to provide pneumatic power. More specifically, as best illustrated in FIG. 1, the operating APU engine 12 drives the rotatable output shaft 24 that is connected by a coupling 35 for coupling a load compressor input shaft 27 on an opposite side of the gearbox from the APU engine to the gearbox rotatable output shaft 25. As noted previously, the load compressor 14 may alternatively be driven directly by rotatable output shaft 24 without the gearbox and gearbox rotatable output shaft 25 (not shown).

Figure 2A:
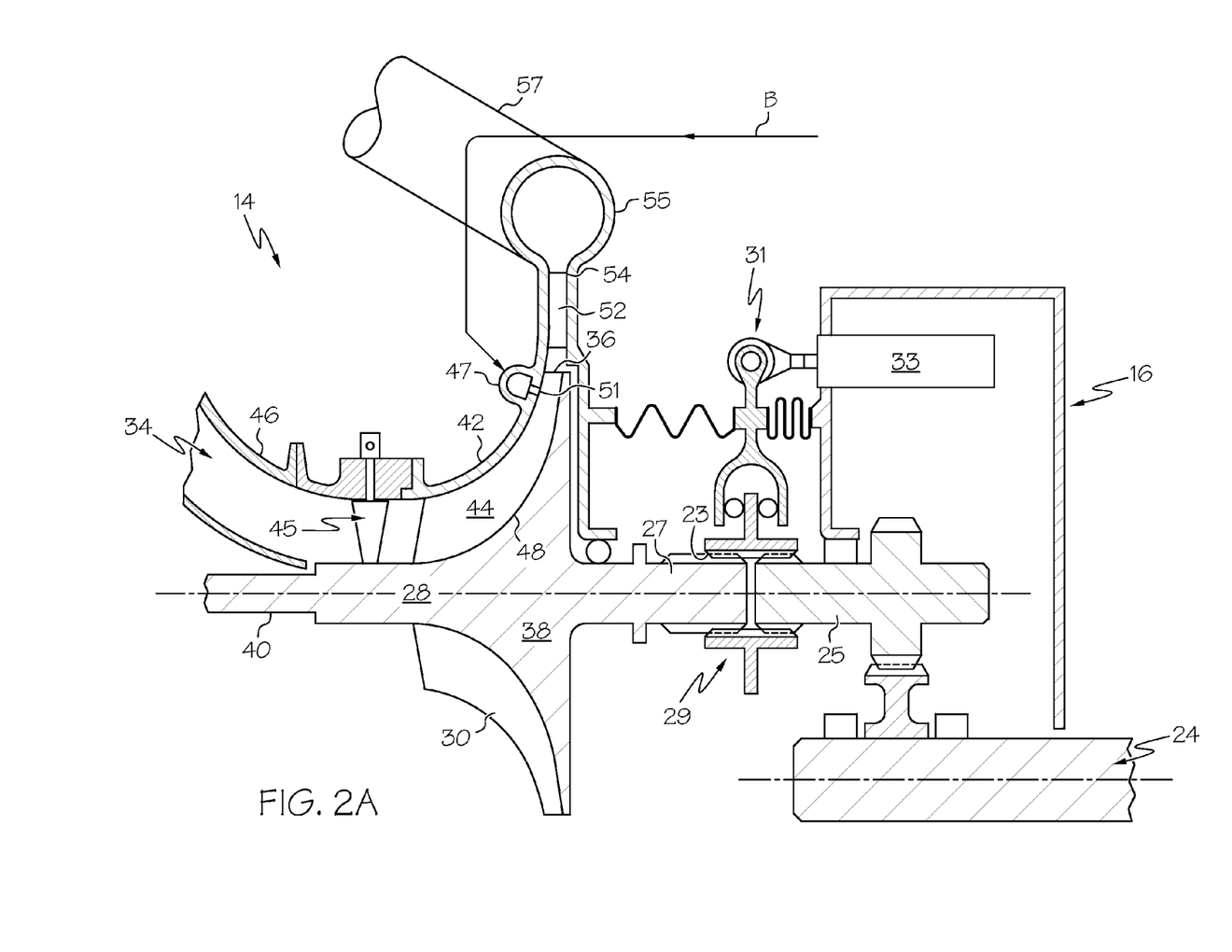
FIG. 2A is a sectional view of the load compressor engaged with the APU engine (more specifically, the load compressor input shaft is engaged with the gearbox output shaft via the coupler comprising a clutchless coupling member and a coupling member actuator) of the exemplary APU of FIG. 1, according to exemplary embodiments.
Figure 2B:
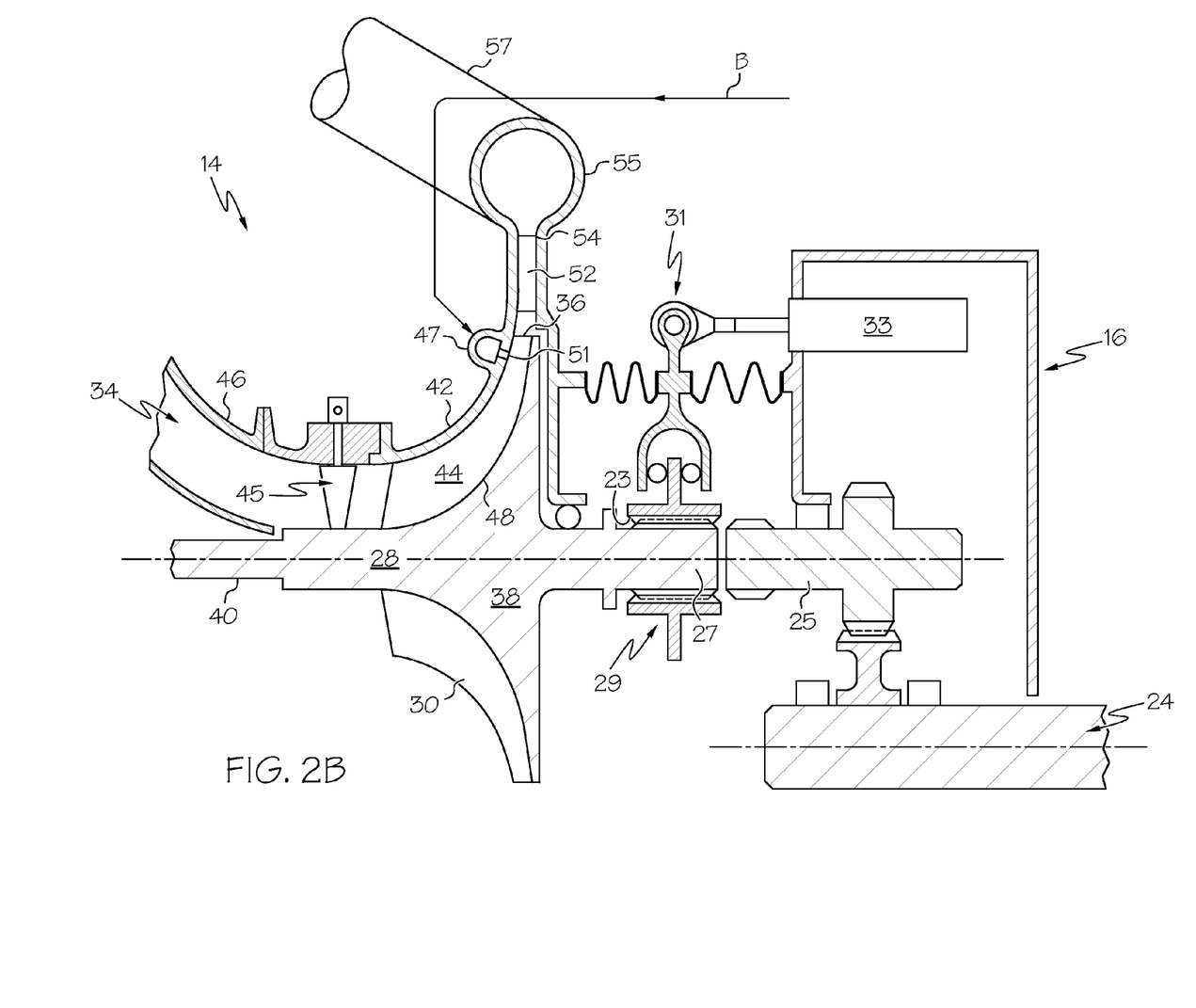
FIG. 2B is a sectional view similar to FIG. 2A, illustrating the load compressor disengaged from the operating APU engine (more specifically, the load compressor input shaft is disengaged from the gearbox output shaft), according to exemplary embodiments.

Referring now specifically to FIGS. 2A and 2B, in an embodiment, the coupling 35 comprises a clutchless coupling member 29 and a coupling member actuator 31, for purposes as hereinafter described. The coupling member actuator 31 may be activated electrically (such as by solenoid 33 in FIGS. 2A and 2B), pneumatically, hydraulically, or combinations thereof. The clutchless coupling member is exemplified by the splined sleeve shown in FIGS. 2A and 2B but other clutchless coupling members may be used to mechanically engage and disengage the load compressor 14 from the operating APU engine. The clutchless coupling member does not engage by friction. The illustrated splined sleeve comprises spline teeth 23 and may be moved via the coupling member actuator 31 (exemplified by a simplified representation of a conventional fork shifter actuator) to engage with similar splined teeth on the shaft ends of gearbox output shaft 25 and LC input shaft 27.

Figure 5A:
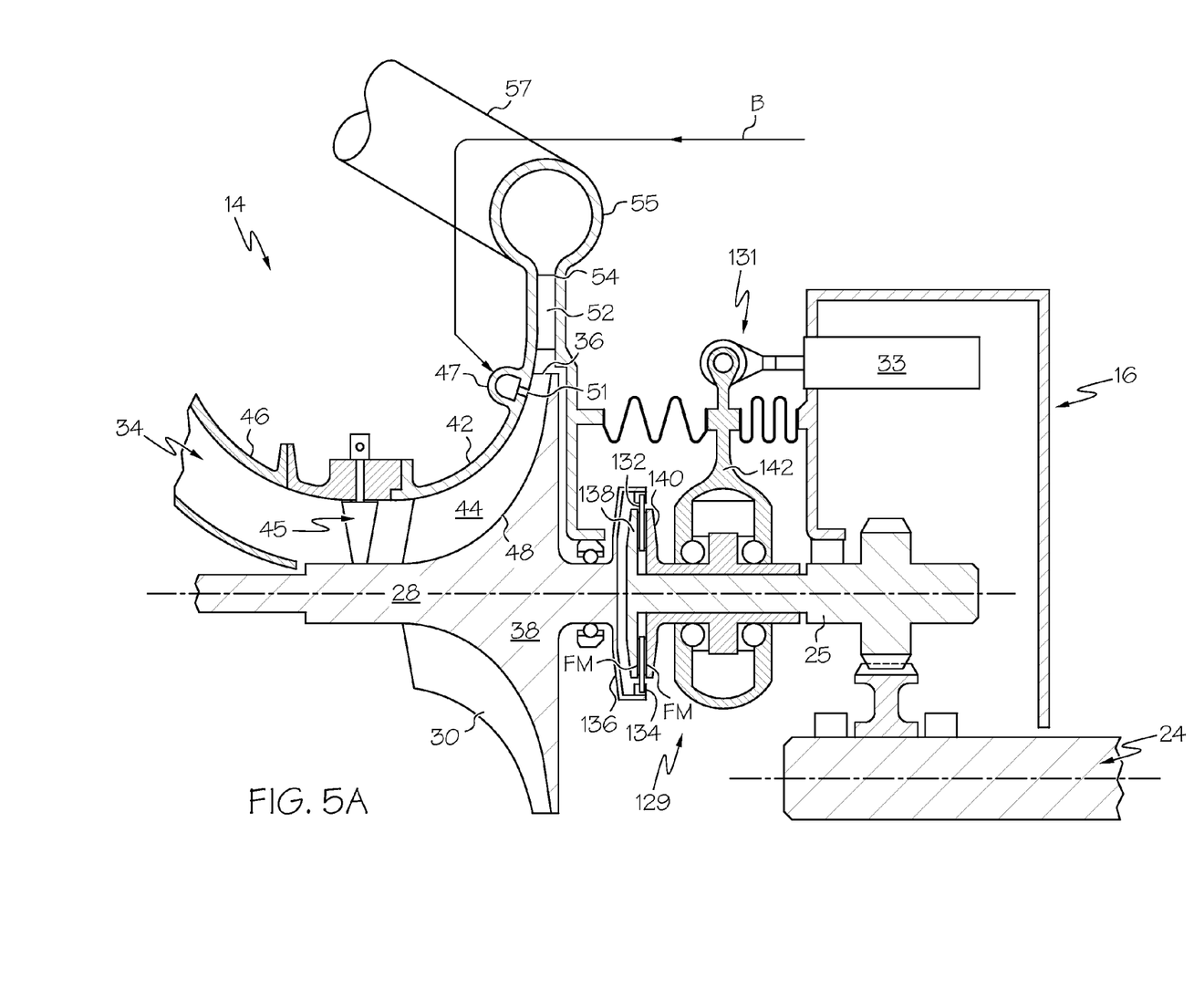
FIGS. 5A and 5B are sectional views of the load compressor engaged with (FIG. 5A) and disengaged from (FIG. 5B) the operating APU engine of the exemplary APU of FIG. 1 (more specifically, the load compressor input shaft is illustrated as engaged with and disengaged from the gearbox output shaft via the coupler comprising a friction clutch and actuator), according to alternative exemplary embodiments.
Figure 5B:
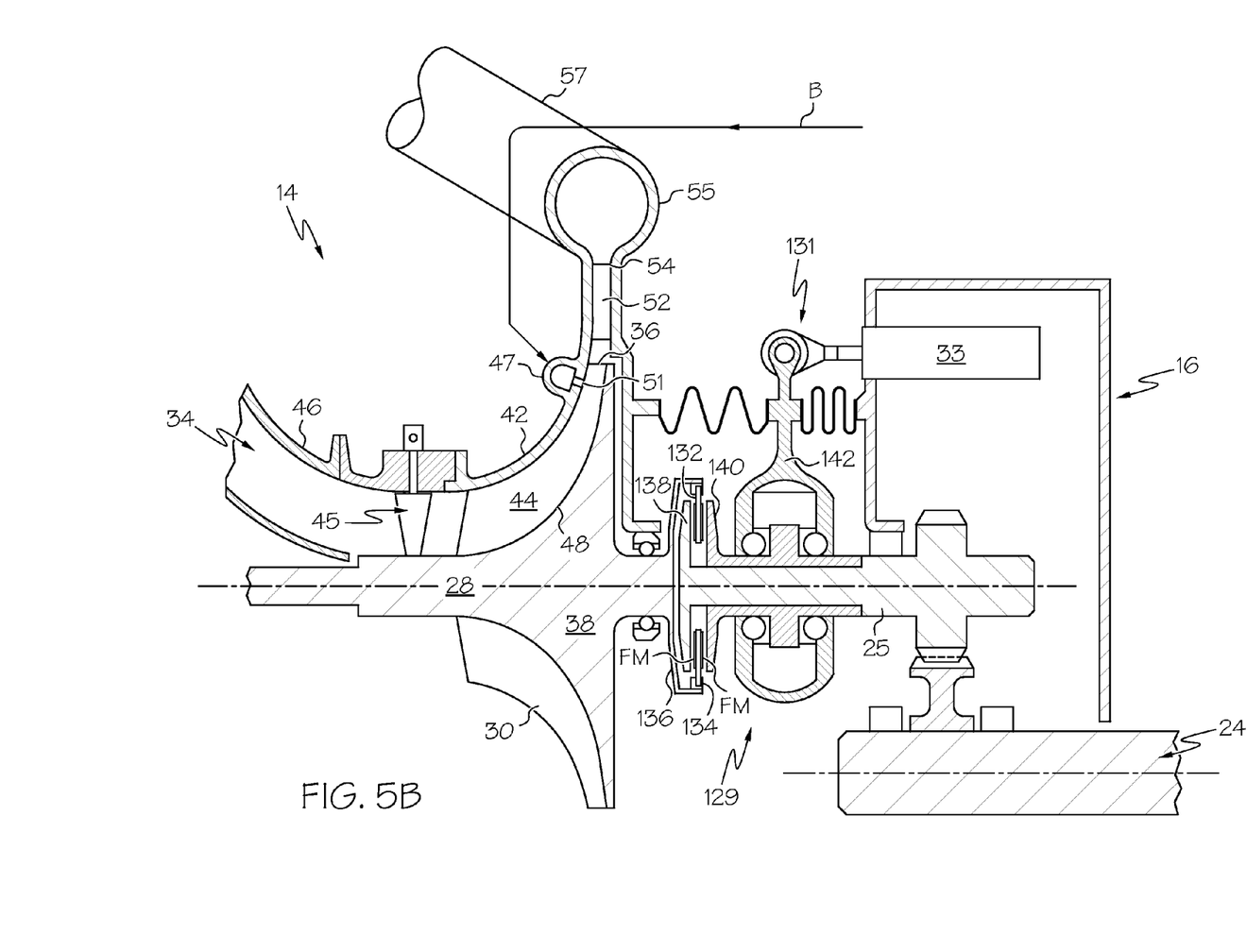

In another embodiment, as illustrated in FIGS. 5A and 5B and hereinafter described, the coupling 35 comprises a friction clutch 129 and friction clutch actuator 131. Both the clutchless coupling member 29 and the friction clutch 129 are "coupling members" as the term is used herein. The friction clutch comprises a friction clutch 129 that transmits torque from the gearbox output shaft 25 (or the APU engine output shaft 24 with a direct-driven load compressor (not shown)) to the LC impeller via a clutch plate 132. The clutch plate 132 may be splined via a spline 134 to a clutch drive housing 136 that is attached to the LC input shaft 27. The clutch plate 132 has friction material (identified as "FM" in FIGS. 5A and 5B) on both surfaces to improve slip performance. Two pressure plates, a forward pressure plate and an aft pressure plate 138 and 140, which are part of the gearbox output shaft 25 straddle the clutch plate 132. Except as specifically described below, the method 100 for activation and deactivation of a load compressor in the exemplary APU 10 is the same, whether the clutchless coupling member 29 or friction clutch 129 couples the load compressor and the operating APU engine.

Referring again to FIGS. 2A through 5B, the load compressor 14 is generally a shaft-mounted centrifugal compressor that provides pneumatic power for the aircraft when the APU 10 is operating (e.g., an APU master switch (not shown) on the aircraft is in the "Run" position) and when the load compressor is activated (e.g., the APU Air switch (not shown) on the aircraft is in the "ON" position). It should be appreciated that the load compressor 14 may be implemented using any one of numerous types of compressors now known or developed in the future. For example, the load compressor may be a single-stage or multi-stage centrifugal compressor. While the load compressor is illustrated on the forward side of the gearbox, it is to be understood that the load compressor may alternatively be on the engine side of the gearbox.

The load compressor 14 includes an impeller 28 that includes a plurality of blades 30. Impeller extends aftward from a compressor inlet 34 and downstream of a plurality of inlet guide vanes (IGVs) 45 (a single IGV is shown for ease of illustration), encompassing the blades and includes an exit 36, a disk 38, and a rotating impeller shaft 40 extending therebetween. The plurality of inlet guide vanes 45 are disposed adjacent or in the inlet 34 of the load compressor and are movable, via one or more inlet guide vane actuators (not shown), to a plurality of positions. The inlet guide vane actuators, and thus the positions of the inlet guide vanes, are controlled via inlet guide vane control logic that is disposed within an APU controller 32, as hereinafter described. Impeller 28 is bounded by a non-rotating shroud 42 defining its radially outer surface. The load compressor extends from the inlet 34 to the impeller exit 36 (referred to herein as "an exducer 36") in a frusto-conical shape. A flowpath 44 is defined between impeller disk 38 and shroud 42. A diffuser 52 is disposed between the impeller exducer 36 and a diffuser outlet 54. The diffuser is positioned radially outwardly from the impeller and includes a diffuser inlet and the diffuser outlet 54. Diffuser inlet is adjacent impeller exit 36 and inlets air to exit impeller serially into diffuser 52. The diffuser 52 separates the impeller 28 from air collection scroll 55. The air collection scroll 55 is in flow communication with diffuser 52 and extends from diffuser outlet 54. Load compressor air (hereinafter "LC air") exits from the air collection scroll 55 through a conduit 57 and through an LC air valve (not shown) to supply pneumatic power for the various aircraft systems and functions, such as the ECS, cabin pressure control system, and/or MES.

Still referring to FIGS. 2A through 5B and returning again to FIG. 1, APU 10 further comprises the APU controller 32 that electronically controls the overall operation of the APU as known in the art. The APU controller 32 is operably coupled to the load compressor, the APU engine, and a bleed air circuit 37. In accordance with exemplary embodiments, as hereinafter described, the APU controller 32 is configured to receive speed signals from one or more speed sensors (not shown) that represent the rotational speed of the impeller in the load compressor 14 (more specifically the load compressor input shaft 27) and the rotational speed of the APU engine output shaft 24 or gearbox output shaft 25. The APU controller 32, in response to the speed signals, activates the coupling member actuator 31 or 131 as hereinafter described to move the coupling member 29 or 129 between engaged and disengaged positions, as hereinafter described. The APU controller 32 also implements suitable control logic to control the position of a bleed air valve 39 to supply compressor discharge bleed air B to pre-spin the load compressor impeller 28, and inlet guide vane actuation logic to control the positions of the plurality of inlet guide vanes 45, as hereinafter described. A detailed description of the various control logic used to control the operation of the APU is not needed to fully describe or enable the claimed invention, and will therefore not be provided.

Figure 3A:
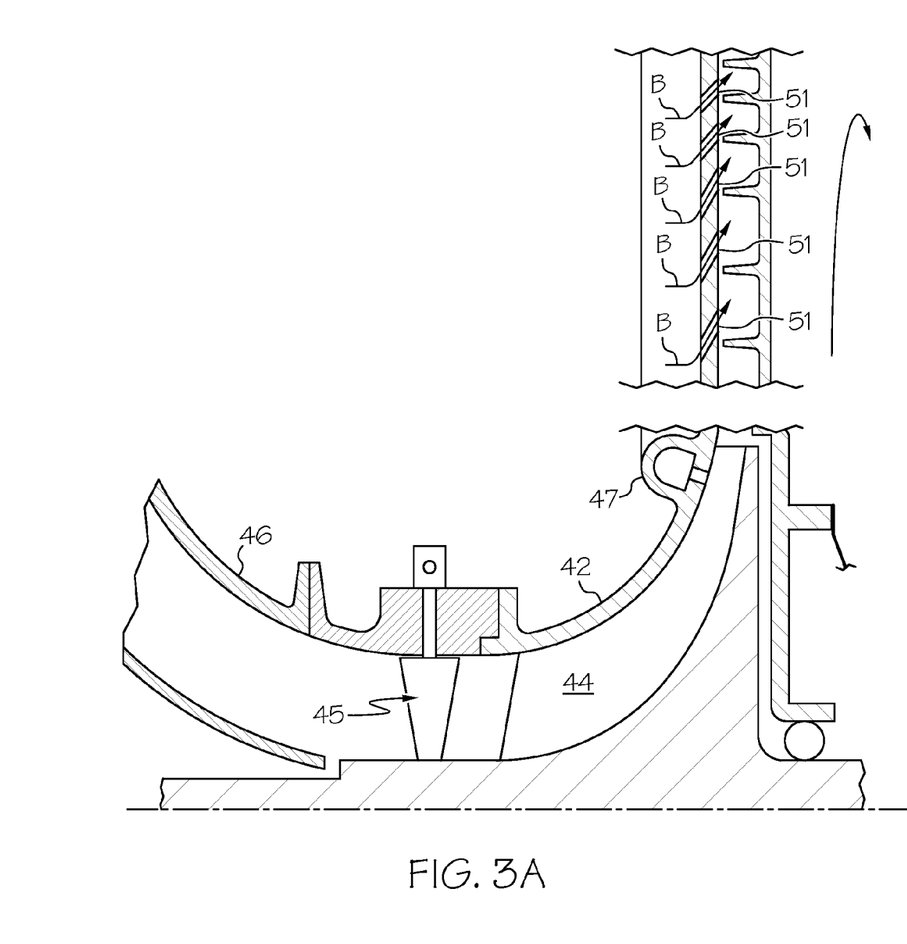
FIG. 3A is a sectional view of the load compressor impeller, illustrating tangential impingement of compressor discharge bleed air through a plurality of injection ports.
Figure 3B:
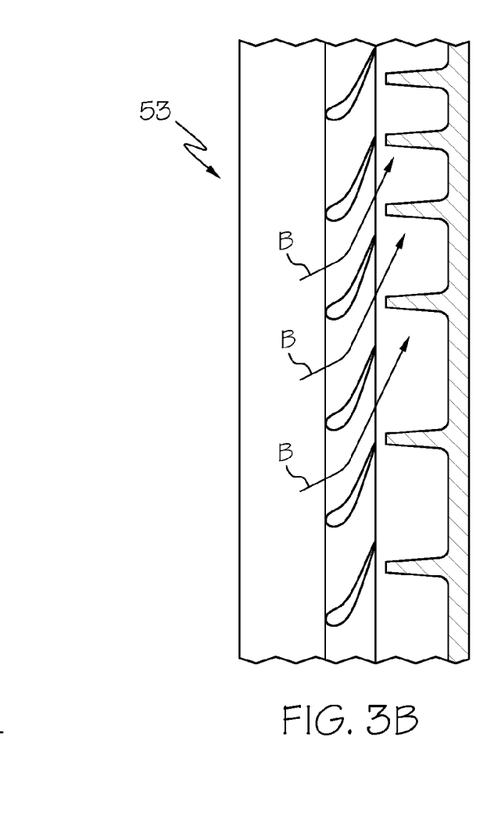
FIG. 3B is a sectional view of a vaned cascade of the load compressor impeller (not shown in FIG. 3B)
Figure 4:
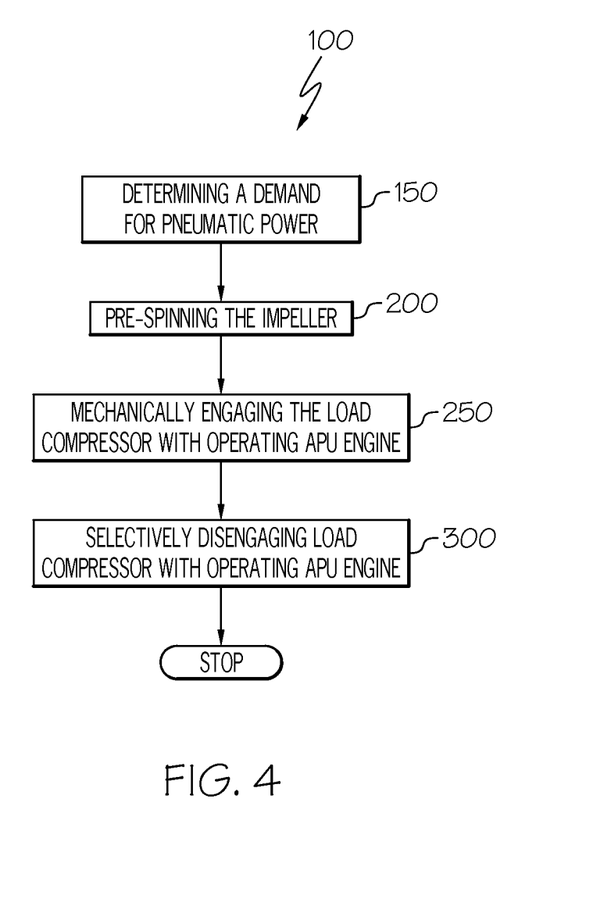
FIG. 4 is a flow diagram of a method for activation and deactivation of a load compressor in the exemplary (operating) APU of FIG. 1, according to exemplary embodiments of the present invention.

Still referring to FIGS. 1 through 3B, and 5A through 5B and referring now to FIG. 4, according to exemplary embodiments, a method 100 for activating and deactivating a load compressor in an operating APU begins by determining that there is a demand for pneumatic power (step 150). The APU controller 32 (FIG. 1) receives a signal that the load compressor 14 should be activated (such as when an APU Air switch (not shown) has been switched by aircraft personnel to the "ON" position) so as to provide pneumatic power to the aircraft. The APU controller 32 responds by automatically activating the load compressor 14 as hereinafter described.

The load compressor is activated by first pre-spinning the impeller 28 of the load compressor 14 to a rotational speed setpoint with a portion of the compressor discharge bleed air B (step 200). The compressor discharge bleed air B or simply "bleed air" is supplied from a P3 bleed air section (downstream of the gas generator compressor 18) of the operating APU engine 12. The "P3" bleed air section is well known to one skilled in the art. As noted previously, a majority of the compressor discharge air is mixed with fuel and burned in the combustor 20 to generate the gas that drives the gas generator turbine 22. A smaller portion of the compressor discharge bleed air is directed through the bleed air circuit 37 to pre-spin the load compressor impeller in accordance with exemplary embodiments. In accordance with exemplary embodiments, the load compressor 14 in fluid flow communication with the gas generator compressor 18, the source of the high pressure compressor discharge bleed air B.

The bleed air circuit 37 has a bleed air circuit inlet 41 and an outlet 43 (FIG. 1). The bleed air circuit inlet 41 is coupled to receive the compressor discharge bleed air portion that is used to pre-spin the impeller, and the outlet 43 is coupled to supply the compressor discharge bleed air portion to pre-spin the load compressor impeller. The bleed air circuit additionally includes the bleed air valve 39 operably disposed in the bleed air circuit upstream of the load compressor 14. The bleed air valve 39 is used to modulate or shut off and turn on the flow of compressor discharge bleed air B for selectively directing the compressor discharge bleed air portion B into the load compressor 14 through the plurality of injection ports 51 (FIG. 3A) or through a vaned cascade 53 (FIG. 3B) near the LC impeller exducer 36. During the pre-spinning step, the bleed air valve 39 and a pre-spin inlet manifold 47 are open and the plurality of inlet guide vanes 45 to the load compressor are substantially closed to minimize the load compressor pumping power, thereby minimizing the required pre-spin bleed airflow. The LC air valve (not shown) is open to permit delivery of LC air to various pneumatic loads, as hereinafter discussed. The load compressor impeller 28 is pre-spun by the compressor discharge bleed air portion B from zero speed (the load compressor in this case having been in standby mode) to the rotational speed setpoint to permit mechanical engagement of the load compressor with the operating APU engine (more specifically, engagement of the load compressor input shaft 27 to either the APU engine output shaft 24 (direct drive) or the gearbox output shaft 25) as hereinafter described. More specifically, a portion of the high pressure compressor discharge (P3) bleed air B is taken from the P3 bleed air section as noted previously, and transferred to the pre-spin inlet manifold 47 on the load compressor shroud 42 near the exducer 36. The term "high pressure" as used herein refers to a pressure greater than about 50 psia. FIG. 3A illustrates the high pressure compressor discharge bleed air portion B injected tangentially through injection ports 51 (a single injection port 51 is shown in FIGS. 2A and 2B and FIGS. 5A and 5B for ease of illustration) or through the vaned cascade 53 (FIG. 3B) near the exducer, and impinges on the impeller blade tips. Multiple injection ports (e.g., greater than two) provide flow and torque balance. The one or more injection points 51 are set at as high a radius on the impeller as possible, but not higher than the limiting radius. The limiting radius is defined as the point where the impeller speed exceeds the injection tangential jet velocity at 100% load compressor rotor RPM. The pre-spin bleed air impinges on the impeller blades at the high radius. Pre-spinning of the impeller comprises contacting a circumferential surface of the impeller with the high pressure compressor discharge bleed air portion B from the gas generator compressor 18, causing the load compressor impeller to pre-spin at an impeller rotational speed to eliminate (in the case of clutchless coupling member 29) or minimize (in the case of friction clutch 129) the speed differential between output shaft 24 or 25 and LC impeller input shaft 27, as hereinafter described.

Referring again to FIGS. 2A and 4, according to exemplary embodiments, method 100 for activating and deactivating the load compressor in the operating APU continues by mechanically engaging the load compressor with the operating APU engine (more specifically, the load compressor input shaft 27 is coupled or engaged with the output shaft 24 of the operating APU engine (direct drive) or the gearbox output shaft 25 (FIG. 2A)) when the LC impeller (more specifically the LC input shaft 27) rotational speed reaches the rotational speed setpoint (step 250). As noted above, pneumatic power is provided to the aircraft by the activated and engaged load compressor. The combination of steps 200 and 250 selectively engage the load compressor with the operating APU engine. The rotational speed setpoint is the rotational speed at which the impeller rotational speed matches a predetermined percentage of the rotational speed of the output shaft. In the case of the clutchless coupling member 29 and actuator 31 (FIG. 2A), the predetermined percentage is 100%, i.e., the rotational speed setpoint is the rotational speed at which the impeller rotational speed matches (100%) the rotational speed of the output shaft. In this case, pre-spinning the load compressor impeller eliminates the rotational speed differential between the LC input shaft 27 and the output shaft 24 or 25 being driven by the APU engine, enabling mechanical engagement of the load compressor with the operating APU engine, as hereinafter described.

The speed sensor (not shown) on the load compressor 14 provides the triggering point for engagement. The speed sensor monitors the LC impeller rotational speed and the rotational speed of the output shaft 24 or 25. APU controller 32 is configured to receive a first speed signal representative of the impeller rotational speed and a second speed signal representative of the rotational speed of the APU engine (more specifically, the rotational speed of the APU engine output shaft 24 or gearbox output shaft 25, depending on whether a direct driven or gearbox-driven compressor is used). The APU controller is further configured to automatically activate the coupling member actuator 31 based on a comparison of the first and second speed signals. The coupling actuator 31 is automatically activated if the LC impeller rotational speed matches (100%) the preset percentage of the rotational speed of the output shaft. The activated actuator moves the clutchless coupling member 29 to an engaged position (as shown respectively in FIGS. 2A and 5A) thereby engaging the load compressor 14 with the operating APU engine 12 such that the operating APU engine 12 (more specifically, the output shaft 24 or 25) may drive the load compressor 14 to supply compressed LC air to the various aircraft systems and functions. Thus, clutchless coupling members 29 may be controlled to selectively engage (and disengage as hereinafter described) the load compressor input shaft 27 with the rotatable output shaft 24 or 25 when the load compressor impeller is pre-spun to match the preset percentage of the rotational speed of the output shaft 24 or 25. If a signal loss occurs in the load compressor speed sensor, the actuation sourced power is disabled to prevent uncontrolled engagement, i.e., the APU controller 32 will prevent the clutchless coupling member 29 from engaging.

When the load compressor 14 is activated, as known in the art, the load compressor draws ambient air into the pre-spin inlet manifold via the plurality of inlet guide vanes 45 in the "open" position, and compresses the air. As the inlet guide vanes start to substantially close, they change the gas entry angle to the impeller and reduce gas flow and load compressor capacity. As is generally known, by selectively adjusting the position of the inlet guide vanes, the flow rate of air (both compressor discharge bleed air and ambient air) entering the load compressor, and thus the flow rate of compressed air (hereinafter referred to as "load controller air" or "LC air") supplied to the various aircraft systems and functions may be regulated. As noted above, LC air may be supplied to the various aircraft systems and functions (also referred to herein as "pneumatic loads") via the LC air valve (not shown) in the "open" position. For ease of illustration, the pneumatic loads are not illustrated, but may include, for example, an environmental control system (ECS), cabin pressure control system, and main engine starting (MES) air for one or more main propulsion engines.

Referring again to FIGS. 2B and 4, the method 100 for activating and deactivating a load compressor in an operating APU continues by selectively disengaging the load compressor from the operating APU engine when demand for pneumatic power ceases (step 300). The load compressor is disengaged from the operating APU engine upon load compressor deactivation. Deactivation may be initiated by, for example, aircraft personnel switching the APU air switch to the "Off" position. As noted above, the engaged load compressor provides pneumatic power (also known as auxiliary air) to the aircraft when the main propulsion engine(s) are not running. However, continued operation of the load compressor when pneumatic power is not needed results in a parasitic loss of fuel and contributes to undesirable air emissions. Therefore, it is beneficial to be able to deactivate the load compressor and selectively disengage the load compressor from the operating APU engine when the demand for pneumatic power ceases, thereby improving aircraft fuel economy and APU performance. As noted above, when the load compressor is disengaged from the operating APU engine, the APU provides electrical power only (i.e., the APU is in generator-only mode).

When a signal is received by the APU controller to deactivate the load compressor to standby mode (such as when the APU air switch is set to the "off" position), the APU controller automatically activates the actuator 31 to move the clutchless coupling member 29 to a disengaged position (FIG. 2B) whereby the deactivated load compressor and the operating APU engine are disengaged. In the illustrated gearbox-driven load compressor of FIG. 2B, disengagement is via moving the splined sleeve off the splined gearbox output shaft 25 to the resting position on the splined LC input shaft 27. Disengagement is accomplished by command from the APU controller 32 (FIG. 1) to first apply a disengaging force via the actuator 31 and then to simultaneously command a momentary gas generator power reduction and substantial closing of the plurality of inlet guide vanes 45, causing the torque acting through the splined drive couplings to go to zero. When the torque drops to a sufficiently low value before reaching zero, the actuator 31 will move the coupler to its resting position on the splined load compressor input shaft 27. The disengaging force can be active or passive. As used herein, the term "active" means a double-acting solenoid 33 in the case of an electrically driven actuator 31. The term "passive" as used herein means a single-acting solenoid 33 with a spring preload. The illustrated exemplary splined sleeve rests on the splined load compressor input shaft when the load compressor is deactivated.

Referring now specifically to FIGS. 5A and 5B, in accordance with an alternative embodiment and as noted previously, the coupling 35 (FIG. 1) may comprise a friction clutch 129 and friction clutch actuator 131 which operate in a conventional manner, and therefore will not be described in detail. While a gearbox-driven compressor is illustrated in FIGS. 5A and 5B, it is to be understood that the load compressor may alternatively be directly driven by output shaft 24 as previously described. The pre-spinning and mechanically engaging steps (200 and 250) to engage the load compressor to the operating APU engine are generally the same as previously described, with the exceptions as noted below. Pre-spinning the impeller of the load compressor to a preset percentage of the rotational speed setpoint with a portion of the compressor discharge bleed air B (step 200) according to exemplary embodiments reduces the wear, and increases clutch life and overall reliability of the otherwise failure-prone friction clutch. The relative speed differential between the gearbox output shaft 25 and the LC drive shaft 27 is reduced (as opposed to eliminated when using the clutchless coupling member) by pre-spinning the LC impeller prior to friction clutch engagement. When pre-spinning the impeller and using a friction clutch, the rotational speed setpoint for the pre-spun impeller may be from about 50% to about 90% of the rotational speed of the output shaft 24 or 25 before engagement of the friction clutch. The pre-spinning step also minimizes the amount of bleed air usage in situations where the gas generator compressor has insufficient surge margin to accommodate the relatively large bleed flow required to pre-spin the impeller to the rotational speed setpoint.

Friction clutches without the pre-spinning step are failure prone when used to engage and disengage a load compressor from an operating APU because, while sufficient pressure is maintained by the pressure plate carrier assembly 142 to prevent slippage at steady state conditions, very high slip rates occur during transient clutch engagement, especially during initial contact between the friction material (FM) and the pressure plates. The friction clutch undergoes transient slip between the driving pressure plates attached to the gearbox output shaft 25 and the driven clutch plate attached to the LC impeller. The LC impeller can accelerate quickly from zero speed to 100% gearbox output shaft speed in a few seconds, resulting in high temperature rise and high wear of the friction material. The transient loading can also result in high inertial forces and vibration, reducing clutch life. The slip condition is most severe at initial clutch engagement as the relative speed differential between the stationary clutch plate and the rotating pressure plates is 100%, resulting in high wear and reduced life of the friction clutch. By pre-spinning the impeller, a conventional friction clutch as known in the art may be used, but the friction clutch may be smaller, lighter, and simpler than the friction clutch used when no pre-spinning occurs. In addition, the pre-spinning step increases clutch life and overall friction clutch reliability.

With the gearbox-driven load compressor (as illustrated in FIGS. 5A and 5B), the friction clutch 129 transmits torque from the gearbox output shaft 25 to the LC impeller via the clutch plate 132. The clutch plate 132 may be splined via the spline 134 to the clutch drive housing 136 that is attached to the LC input shaft 27. The clutch plate 132 friction material (identified as "FM" in FIGS. 5A and 5B) on both surfaces improves slip performance. As noted previously, two pressure plates, a forward pressure plate and an aft pressure plate 138 and 140, which are part of the gearbox output shaft 25 straddle the clutch plate 132. When pneumatic power is needed (i.e., the load compressor is to be engaged), the APU controller 32 commands the actuator 131 to move the friction clutch (a "coupling member") between the engaged and disengaged position (more specifically, the APU controller 32 commands the actuator 131 to move a pressure plate carrier assembly 142 (shown attached to aft pressure plate 140) of the friction clutch toward the clutch plate 132). This movement clamps the clutch plate 132 between the forward and aft pressure plates 138 and 140, resulting in clutch engagement and engagement of the load compressor with the operating APU engine (more specifically engagement between the impeller input shaft 27 and the gearbox output shaft 25). The activated actuator moves the pressure plate carrier assembly 142 to an engaged position (as shown in FIG. 5A) thereby engaging the load compressor 14 with the operating APU engine 12 such that the operating APU engine 12 (more specifically, the output shaft) may drive the load compressor 14 to supply compressed LC air to the various aircraft systems and functions. When the load compressor is disengaged (step 300) as illustrated in FIG. 5B, the LC impeller and clutch plate are not rotating, while the gearbox output shaft 25 and the pressure plates are rotating. There is a small gap between the clutch plate and the pressure plates such that no load is transmitted to the load compressor impeller.

Steps 200, 250, and 300 may be repeated as many times as necessary as the demand for APU pneumatic power changes. While performance of steps 200 and 250 prior to step 300 has been described, it is to be understood that step 300 may alternatively be performed prior to steps 200 and 250 depending upon whether the load compressor is already activated or already deactivated.

It is to be appreciated that systems and methods have been provided for activation and deactivation of a load compressor in an operating APU. The activated load compressor is selectively engaged with the operating APU engine when pneumatic power is needed, thereby maintaining operational flexibility and engagement is with lower inertial loading thereby improving APU performance. The deactivated load compressor is selectively disengaged from the operating APU engine when pneumatic power is not needed, thereby improving aircraft fuel economy and reducing undesirable air emissions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims and their legal equivalents.

What is claimed is:

1. An auxiliary power unit comprising:
   a load compressor having an impeller;
   an auxiliary power unit engine adapted to be mechanically engaged to the load compressor to drive the load compressor to provide pneumatic power and to be disengaged therefrom when the need for pneumatic power ceases;
   a coupling member coupled between the load compressor and auxiliary power unit engine and configured to be controllably moved between an engaged position, in which the auxiliary power unit engine is mechanically engaged with the load compressor, and a disengaged position, in which the auxiliary power unit engine is disengaged from the load compressor;
   pre-spinning means coupled to the load compressor and configured to selectively pre-spin the impeller; and
   an auxiliary power unit controller operably coupled to the load compressor, the auxiliary power unit engine, the coupling member, and the pre-spinning means, the auxiliary power unit controller adapted to receive rotational speed signals and configured, in response thereto, to (i) selectively cause the pre-spinning means to pre-spin the impeller to a rotational speed setpoint; and (ii) selectively move the coupling member between the engaged and disengaged positions,
   wherein the pre-spinning means comprises a bleed air circuit adapted to supply compressor discharge bleed air to pre-spin the impeller to the rotational speed setpoint.

2. The auxiliary power unit of Claim 1, wherein the coupling member comprises a clutchless coupling member or a friction clutch.

3. The auxiliary power unit of Claim 1, wherein the auxiliary power unit controller automatically activates an actuator to move the coupling member.

4. The auxiliary power unit of claim 3, wherein the auxiliary power unit controller receives the rotational speed signals comprising a first speed signal representative of a rotational speed of the impeller of the load compressor and a second speed signal representative of a rotational speed of the auxiliary power unit engine, the auxiliary power unit controller responsive to the first and second speed signals to activate the actuator to move the coupling member to the engaged position upon the rotational speed of the impeller reaching the rotational speed setpoint.

5. The auxiliary power unit of Claim 1, wherein the load compressor further comprises a plurality of inlet guide vanes at an inlet thereof and movable between positions substantially opening and substantially closing the inlet.

6. The auxiliary power unit of claim 5, wherein the auxiliary power unit controller is further responsive, if the rotational speed setpoint is reached, to:
    modulate the plurality of inlet guide vanes substantially open; and
    open a load compressor bleed valve.

7. The auxiliary power unit of claim 1, wherein the auxiliary power unit engine comprises a gas generator compressor, a combustor, and a gas generator turbine, the gas generator compressor adapted to provide the compressor discharge bleed air in the bleed air circuit causing the impeller to pre-spin to the rotational speed setpoint.

8. The auxiliary power unit of claim 7, wherein the rotational speed setpoint comprises the rotational speed at which the impeller rotational speed matches a predetermined percentage of the rotational speed of an auxiliary power unit engine output shaft or gearbox output shaft.

9. The auxiliary power unit of Claim 8, wherein the coupling member comprises a clutchless coupling member and the predetermined percentage is 100%.

10. A method for activating and deactivating a load compressor in an operating auxiliary power unit comprising auxiliary power unit engine and a load compressor, the method comprising:
    selectively engaging the load compressor with the auxiliary power unit engine to activate the load compressor by:
        pre-spinning an impeller of the load compressor to a rotational speed setpoint with compressor discharge bleed air provided by a source in fluid flow communication with the load compressor; and
        mechanically engaging the load compressor with the auxiliary power unit engine when a rotational speed of the impeller reaches the rotational speed setpoint; and
    selectively disengaging the load compressor from the operating auxiliary power unit engine to deactivate the load compressor.

11. The method of claim 10, wherein the auxiliary power unit engine comprises a gas generator compressor, the step of selectively engaging the load compressor with the auxiliary power unit engine further comprises opening a bleed air valve disposed between the gas generator compressor and the load compressor and a pre-spin inlet manifold such that compressor discharge bleed air flows into the impeller.

12. The method of claim 10, wherein pre-spinning of the impeller to the rotational speed setpoint comprises contacting a circumferential surface of the load compressor impeller with high pressure compressor discharge bleed air.

13. The method of claim 10, wherein a coupling member is coupled between the load compressor auxiliary power unit engine, the coupling member comprising a clutchless coupling member or a friction clutch, and the step of mechanically engaging the load compressor with the operating auxiliary power unit engine comprises activating an actuator to move the coupling member to an engaged position.

14. The method of claim 13, wherein pre-spinning of the impeller to the rotational speed setpoint comprises pre-spinning the impeller to a rotational speed that is 100% of the rotational speed of the auxiliary power unit engine, when the coupling member comprises the clutchless coupling member.

15. The method of claim 11, wherein the step of disengaging the load compressor from the operating auxiliary power unit engine comprises:
    modulating the plurality of inlet guide vanes substantially closed to discontinue the flow of compressor discharge bleed air through the impeller; and
    providing a momentary gas generator power reduction.

16. The method of claim 13, wherein the step of mechanically engaging the load compressor with auxiliary power unit engine when a rotational speed of the impeller reaches the rotational speed setpoint comprises:
    determining the speed signal value of the impeller;
    determining the speed signal value of the auxiliary power unit engine;
    comparing the speed signal value of the impeller against the speed signal value of the auxiliary power unit engine; and
    activating the actuator to move the clutchless coupling member to the engaged position when the speed signal value of the impeller matches auxiliary power unit engine speed signal value such that the operating auxiliary power unit engine is engaged with and drives the load compressor to provide pneumatic power.

17. A system for activating and deactivating a load compressor in an operating auxiliary power unit including an auxiliary power unit engine, the system comprising:
    the load compressor in fluid flow communication with a source of compressor discharge bleed air and adapted to be mechanically engaged with the auxiliary power unit engine when the demand for load compressor exists and disengaged therefrom when demand therefor ceases;
    a coupling member coupled between the load compressor and the auxiliary power unit engine and configured to be controllably moved between an engaged position, in which the load compressor is mechanically engaged with the auxiliary power unit engine, and a disengaged position, in which the auxiliary power unit engine is disengaged from the load compressor;
    a bleed control circuit for supplying the compressor discharge bleed air to an impeller of the load compressor to pre-spin the impeller to a rotational speed setpoint;
    an auxiliary power unit controller operably coupled to the load compressor, the bleed control circuit, a coupling member actuator, and the auxiliary power unit engine and adapted to receive a first speed signal representative of a rotational speed of the impeller of the load compressor and a second speed signal representative of a rotational speed of the auxiliary power unit engine and configured, in response thereto, to selectively (i) cause the compressor discharge bleed air to pre-spin the impeller; and (ii) move the coupling member between the engaged and disengaged positions, the coupling member actuator moving the coupling member to the engaged position when the impeller rotational speed matches the rotational speed setpoint.

18. The system of claim 17, wherein the bleed air circuit has a bleed air circuit inlet and an outlet, the bleed air circuit inlet adapted to receive the compressor discharge bleed air and the outlet adapted to supply the compressor discharge bleed air to pre-spin the impeller, the bleed air circuit including a bleed control valve operably disposed in the bleed air circuit upstream of the load compressor for modulating or shutting off and turning on the flow of compressor discharge bleed air to the load compressor.

19. The system of claim 17, wherein the auxiliary power unit controller is configured to activate the coupling member actuator based on a comparison of the first and second speed signals, the coupling member actuator activated if the rotational speed setpoint is reached.

\* \* \* \* \*